US012546331B2

(12) United States Patent
Lu

(10) Patent No.: US 12,546,331 B2
(45) Date of Patent: Feb. 10, 2026

(54) FAN ROTOR AND MANUFACTURING METHOD THEREOF

(71) Applicant: DELTA ELECTRONICS, INC., Taoyuan (TW)

(72) Inventor: Chao-Wen Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 19/063,215

(22) Filed: Feb. 25, 2025

(65) Prior Publication Data

US 2025/0334131 A1 Oct. 30, 2025

(30) Foreign Application Priority Data

Apr. 26, 2024 (CN) ......................... 202410512236.7

(51) Int. Cl.

*F04D 29/28* (2006.01)
*F04D 29/32* (2006.01)
*F04D 29/38* (2006.01)

(52) U.S. Cl.

CPC ......... *F04D 29/384* (2013.01); *F04D 29/329* (2013.01); *F04D 29/388* (2013.01); *F05D 2230/13* (2013.01)

(58) Field of Classification Search

CPC . F04D 29/185; F04D 29/2211; F04D 29/2222
See application file for complete search history.

(56) References Cited

U.S. PATENT DOCUMENTS

| | | | | |
|---|---|---|---|---|
| 2,658,455 | A * | 11/1953 | Seinfeld | F04D 29/2211 415/106 |
| 3,256,964 | A * | 6/1966 | Dotter | B62L 5/06 192/217.7 |
| 7,341,424 | B2 * | 3/2008 | Dial | F04D 29/2238 415/90 |
| 7,487,641 | B2 * | 2/2009 | Frechette | B82Y 15/00 60/670 |
| 9,273,559 | B2 | 3/2016 | Knorr et al. | |
| 10,550,846 | B2 * | 2/2020 | Hino | F01D 1/36 |
| 10,670,301 | B1 * | 6/2020 | Waldner | F24H 3/0405 |
| 10,844,876 | B2 * | 11/2020 | Kenyon | F04D 29/023 |

(Continued)

FOREIGN PATENT DOCUMENTS

| | | |
|---|---|---|
| CN | 1407244 A | 4/2003 |
| CN | 201650619 U | 11/2010 |

(Continued)

OTHER PUBLICATIONS

Office Action dated Feb. 8, 2025 of the corresponding Taiwan patent application No. 113115648.

*Primary Examiner* — Kayla Mccaffrey
(74) *Attorney, Agent, or Firm* — HDLS IPR SERVICES; Chun-Ming Shih

(57) ABSTRACT

This disclosure is directed to a fan rotor having an annular disk and a plurality of vanes. The vanes and the annular disk are formed as one piece by etching, the vanes are configured in a radial arrangement on the annular disk, each of the vanes is defined with a thickness greater than or equal to 0.03 mm and less than or equal to 0.1 mm, a groove is defined between each vane and another vane adjacent thereto, and each groove is defined with a width equal to or larger than 0.2 mm.

11 Claims, 13 Drawing Sheets

(56) References Cited

U.S. PATENT DOCUMENTS

| | | | | |
|---|---|---|---|---|
| 11,365,750 | B2 * | 6/2022 | Wang | F04D 25/0613 |
| 2007/0116561 | A1 * | 5/2007 | Hill | F04D 29/703<br>415/206 |
| 2017/0300094 | A1 | 10/2017 | Delano et al. | |

FOREIGN PATENT DOCUMENTS

| | | | |
|---|---|---|---|
| CN | 104033187 | B | 4/2017 |
| CN | 107542699 | A | 1/2018 |
| CN | 109074139 | A | 12/2018 |
| DE | 4403224 | A1 | 8/1995 |
| TW | 200730733 | A | 8/2007 |
| TW | 201344061 | A | 11/2013 |
| TW | I779734 | B | 10/2022 |

* cited by examiner

FAN ROTOR AND MANUFACTURING METHOD THEREOF

BACKGROUND OF THE INVENTION

Technical Field

This disclosure is directed to a fan rotor, in particular to a centrifugal fan rotor having micro vanes densely configured and etching method thereof.

Description of Related Art

A related centrifugal fan tends to produce significant noise caused by vanes. A vanes configuration with higher density may reduce the workload of each fan vane. A configuration with more vanes may separate a part of the noises in higher frequencies so as the reduce surge noise caused by the vanes.

However, a related fan wheel may be made by plastic injection molding, metal stamping or casting. The aforementioned manufacturing methods have product size limitations so that products which are meet arrangement requirements of current electronic products such as narrow space and high density configuration of vanes cannot be manufactured by the aforementioned manufacturing methods.

In views of this, in order to solve the above disadvantage, the inventor studied related technology and provided a reasonable and effective solution in this disclosure.

SUMMARY OF THE INVENTION

This disclosure is directed to a centrifugal fan rotor having micro vanes densely configured and etching method thereof.

This disclosure is directed to a fan rotor having an annular disk and a plurality of vanes. The vanes and the annular disk are formed as one piece by etching, the vanes are configured in a radial arrangement on the annular disk, each of the vanes is defined with a thickness greater than or equal to 0.03 mm and less than or equal to 0.1 mm, a groove defined between each vane and another vane adjacent thereto, and each groove defined with a width equal to or larger than 0.2 mm.

In an embodiment of this disclosure, the annular disk has a plurality of through opening, and the through openings are defined at the grooves respectively.

In an embodiment of this disclosure, each vane has a height greater than or equal to 0.05 mm and less than or equal to 0.2 mm.

In an embodiment of this disclosure, a height of the vane is uniformly defined with respect to the annular disk.

In an embodiment of this disclosure, the vanes are respectively disposed at two sides of the annular disk.

In an embodiment of this disclosure, the vanes are respectively disposed at one sides of the annular disk.

In an embodiment of this disclosure, the fan rotor further has a hub, the hub is arranged at a center of the annular disk, the hub has a plurality of external lugs disposed at an outer edge thereof, the annular disk has a plurality of connecting holes disposed on an inner edge thereof corresponding to the external lug respectively, the external lugs are respectively connected to the connecting holes.

This disclosure is directed to a fan rotor having a hub and a plurality of fan wheels. The fan wheels are arranged on the hub, the fan wheels arranged in a stack and at intervals, each of the fan wheels has a annular disk and a plurality of vanes, the vanes and the annular disk in each of the fan wheels formed as one piece by etching, the vanes disposed in a radial arrangement on the annular disk, each of the vanes is defined with a thickness greater than or equal to 0.03 mm and less than or equal to 0.1 mm, a groove defined between each vane and another vane adjacent thereto, and each groove is defined with a width equal to or larger than 0.2 mm.

In an embodiment of this disclosure, the annular disk has a plurality of through opening, and the through openings are defined at the grooves respectively.

In an embodiment of this disclosure, each vane has a height greater than or equal to 0.05 mm and less than or equal to 0.2 mm.

In an embodiment of this disclosure, a height of the vane is uniformly defined with respect to the annular disk.

In an embodiment of this disclosure, the vanes are respectively disposed at two sides of the annular disk.

In an embodiment of this disclosure, the vanes are respectively disposed at one sides of the annular disk.

In an embodiment of this disclosure, the hub has a plurality of external lugs disposed at an outer edge thereof, the external lugs are stacked along an axial direction of the hub and separated from each other in a circumferential direction of the hub, each of the annular disks has a plurality of internal lugs corresponding to the external lugs disposed on an inner edge thereof, the external lugs are connected to the internal lugs respectively.

This disclosure is directed to a manufacturing method of a fan rotor having: providing an annular piece; configuring a photoresist on a surface of the annular piece, and defining a predetermined appearance of a plurality of vanes; etching the annular piece to remove a part of the annular piece without the photoresist to form an annular disk and the vanes the vanes are disposed on the annular disk; removing the photoresist. The vanes are disposed in a radial arrangement, the vanes are disposed at intervals equal to or larger than 0.2 mm, each of the vanes is defined with a thickness greater than or equal to 0.03 mm and less than or equal to 0.1 mm.

In an embodiment of this disclosure, the annular piece is etched to penetrate the annular disk to form a plurality of through openings, each of the through openings is disposed between two of the vanes adjacent to each other.

In an embodiment of this disclosure, two sides of the annular piece are etched to form the vanes at two sides of the annular disk.

In an embodiment of this disclosure, one side of the annular piece is etched to form the vanes.

In an embodiment of this disclosure, each vane has a height greater than or equal to 0.05 mm and less than or equal to 0.2 mm.

The vanes are formed by etching in the manufacturing method of the fan rotor according to this disclosure forms so as to be manufacture a centrifugal fan rotor having micro vanes densely configured.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
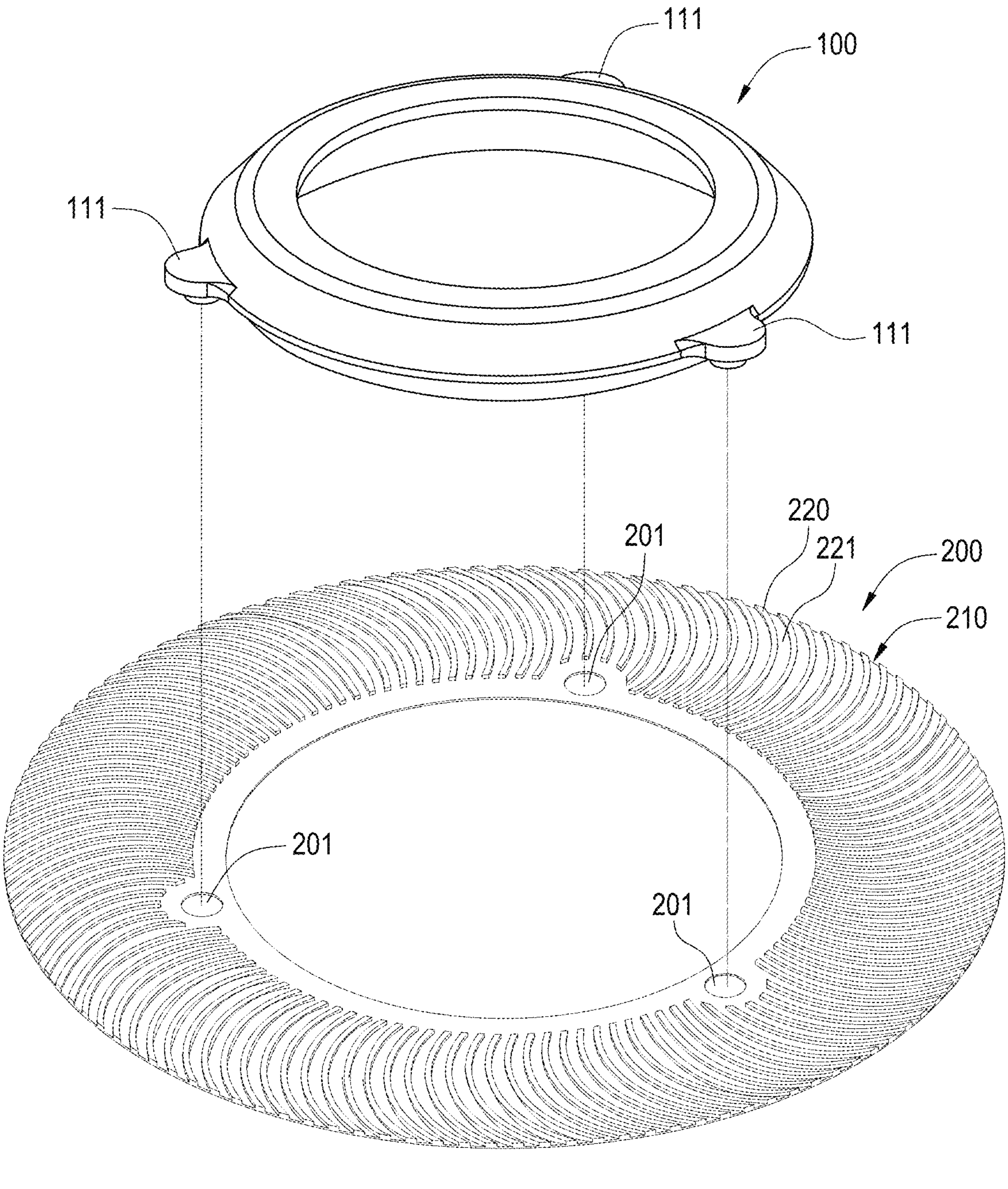
FIG. 1 is an exploded view showing a fan rotor according to the first embodiment of this disclosure.
Figure 2:
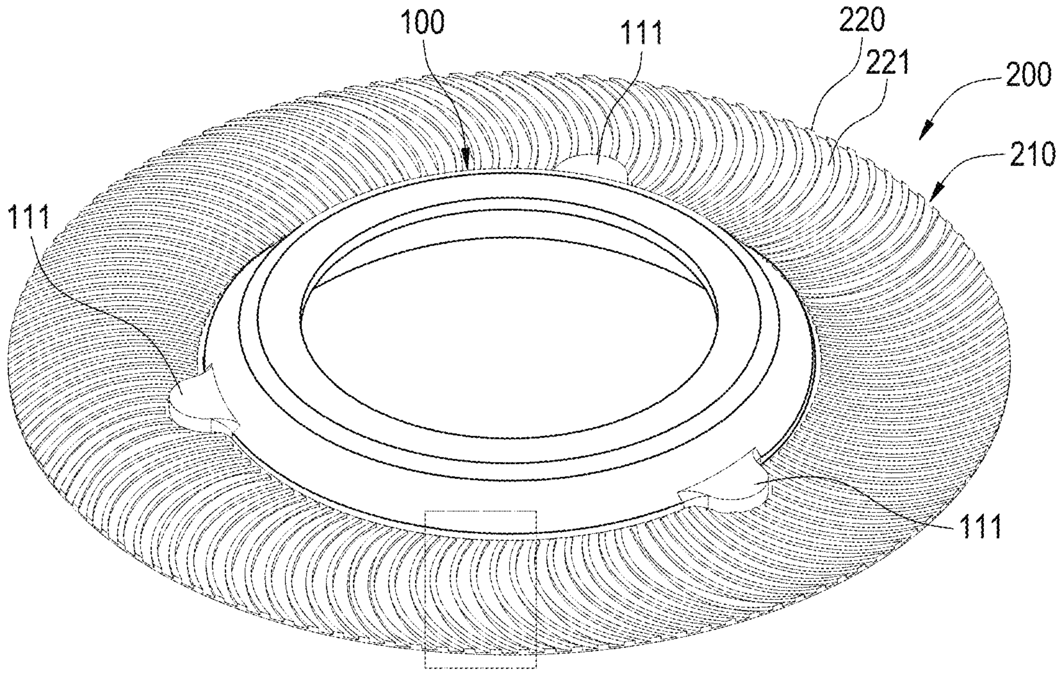
FIG. 2 is a perspective view showing the fan rotor according to the first embodiment of this disclosure.
Figure 3:
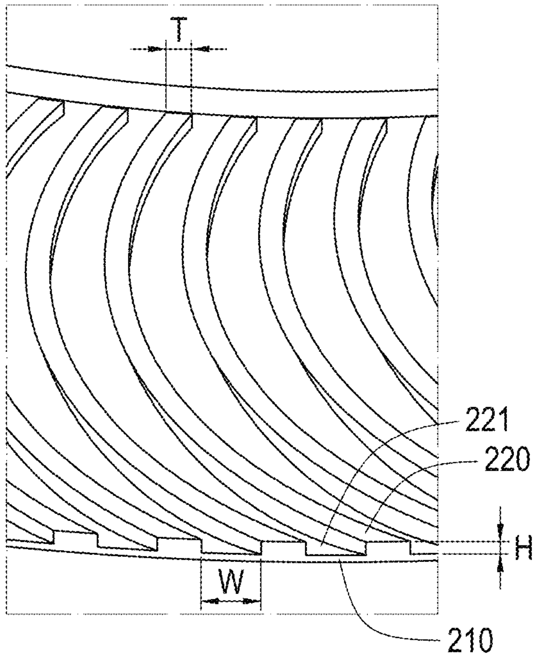
FIG. 3 is a partial enlarged view of FIG. 2.
Figure 4:
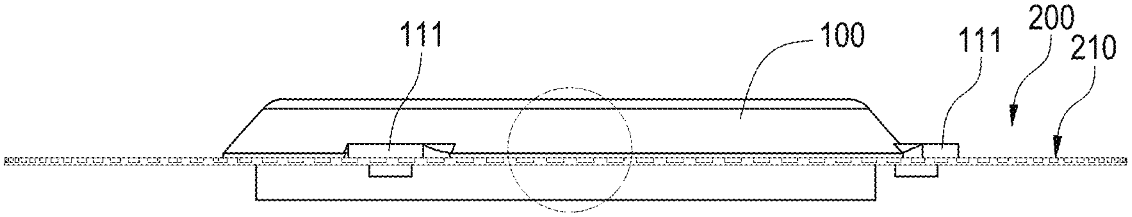
FIG. 4 is a side view of the fan rotor according to the first embodiment of this disclosure.
Figure 5:
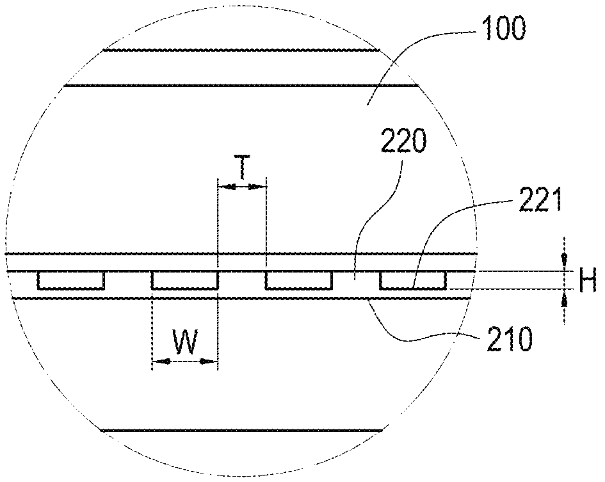
FIG. 5 is a partial enlarged view of FIG. 4.

The technical contents of this disclosure will become apparent with the detailed description of embodiments accompanied with the illustration of related drawings as follows. It is intended that the embodiments and drawings disclosed herein are to be considered illustrative rather than restrictive.

Detailed descriptions and technical contents of this disclosure is described in the flowing paragraph with reference to the drawings. However, the drawings are attached only for illustration and are not intended to limit this disclosure.

It should be understood that the orientations or positional relationships in this disclosure which are indicated by the terms such as "front side", "rear side", "left side", "right side", "front end", "rear end", "end", "vertical", "horizontal", "vertical", "top" and "bottom" are based on the orientations or positional relationships as shown in the drawings. These are only used for describing this disclosure and simplifying the description rather than indicating or implying that the device or element have a specific orientation or be constructed and operated in a specific orientation, and it should not be considered as limitations of the scopes of this disclosure.

The terms used herein without additional definition such as "substantially" and "approximately" are used to describe and illustrate small changes. When used in an event or situation, the term may include the precise moment at which the event or situation occurs, and a close approximation to moment the event or situation occurs. For example, when combined with a numerical value, the term may include a range of variation less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The detail descriptions and technical contents of this disclosure are described in the following paragraphs with reference to the drawings. However, the attached drawings are only used for illustrative purposes rather than limitations of the scopes of this disclosure.

According to an embodiment of this disclosure as shown in FIGS. 1 to 5, a fan rotor at least has a fan wheel 200, the fan wheel 200 has an annular disk 210 and a plurality of vanes 220. The vanes 220 are arranged in a radial arrangement on the annular disk 210 and formed as one piece. According to this embodiment, all of the vanes 220 are arranged together on one side of the annular disk 210, and another side of the annular disk 210 is a flat surface.

Each of the vanes 220 is defined with a thickness T and a height H, the thickness T parallel to the annular disk 210, and the height H is perpendicular to the annular disk 210. According to this embodiment, in each of the vanes 220, the thickness T is uniform along a longitudinal direction of the vane 220 and greater than or equal to 0.03 mm and less than or equal to 0.1 mm, but scopes of this disclosure should not be limited to this. For example, the thickness T of the vane 220 may be varied along the longitudinal direction of the vane 220. According to this embodiment, in each of the vanes 220, the height His uniformly defined with respect to the annular disk 210 and greater than or equal to 0.05 mm and less than or equal to 0.2 mm. According to this embodiment, each and another adjacent of the vanes 220 are defined with an interval which is equal to or larger than 0.2 mm. Specifically, a groove 221 is defined between the vane 220 and another vane 220 adjacent thereto, the groove 221 is defined with a width W (namely the interval mentioned above), the width W is parallel to the annular disk 210 and may be various at various portions along a longitudinal direction of the groove 221, but the width W of the groove 221 is equal to or larger than 0.2 mm.

According to this embodiment, the fan rotor further has a hub 100, and the hub 100 is arranged at a center of the fan wheel 200. Specifically, the hub 100 has a plurality of external lugs 111 disposed at an outer edge thereof, the annular disk 210 has a plurality of connecting holes 201 disposed at an inner edge thereof corresponding to the external lug 111, the external lugs 111 are connected to the connecting hole 201 respectively to position the hub 100 at a center of the annular disk 210.

Figure 6:
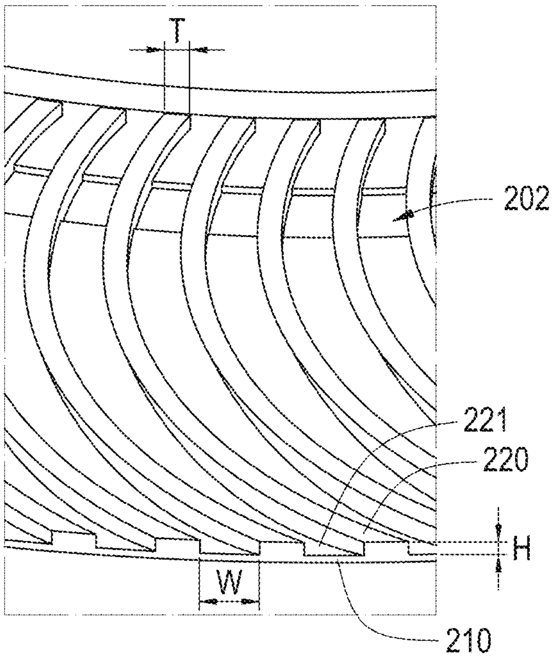
FIG. 6 is a perspective view showing a through opening according to the first embodiment of this disclosure.
Figure 7:
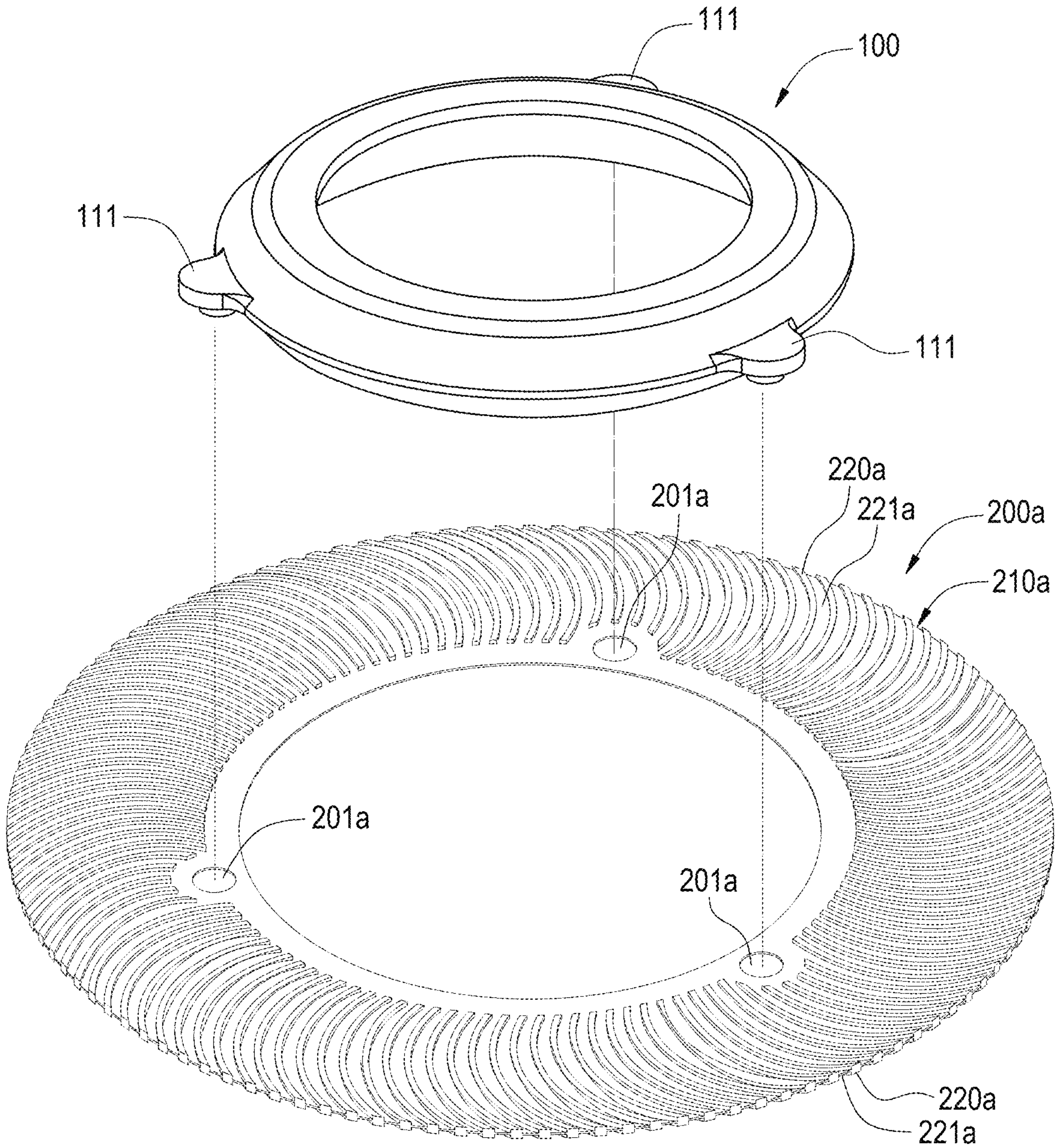
FIG. 7 is an exploded view showing a fan rotor according to the second embodiment of this disclosure.
Figure 8:
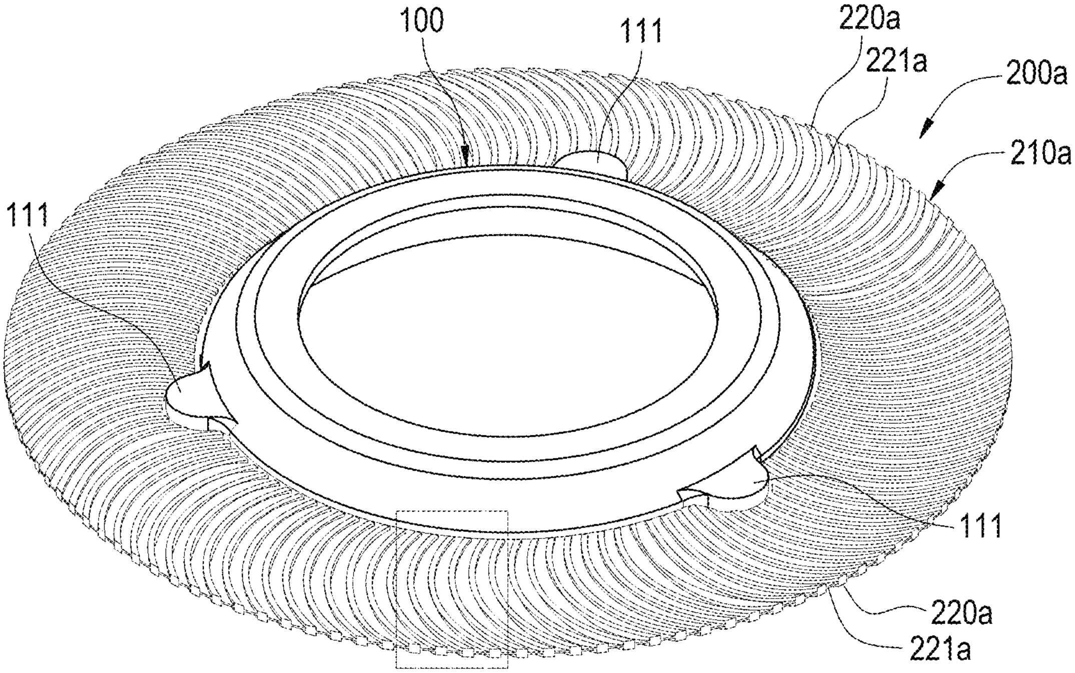
FIG. 8 is a perspective view showing the fan rotor according to the second embodiment of this disclosure.
Figure 9:
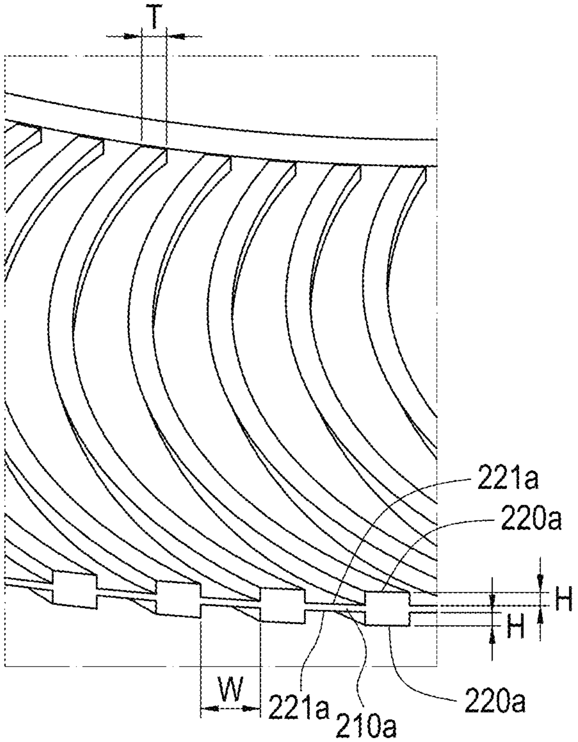
FIG. 9 is a partial enlarged view of FIG. 8.
Figure 10:
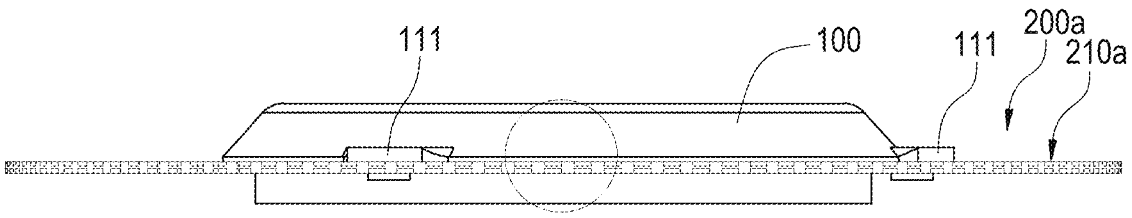
FIG. 10 is a side view of the fan rotor according to the second embodiment of this disclosure.
Figure 11:
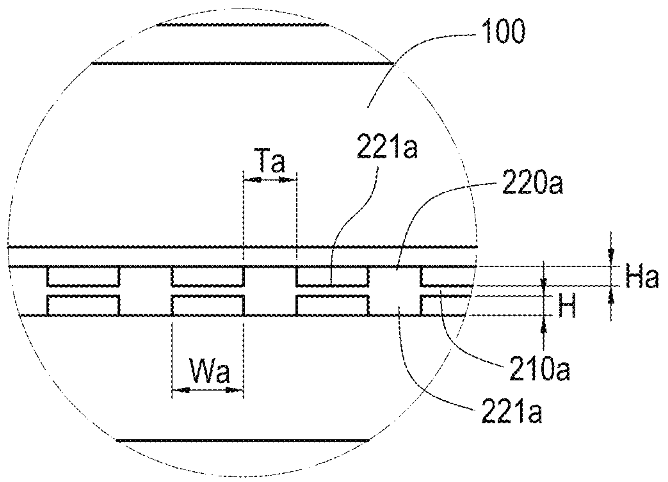
FIG. 11 is a partial enlarged view of FIG. 10.

According to this embodiment as shown in FIG. 6, the annular disk 210 may be provided with a plurality of through openings 202 communicating two sides of the annular disk 210, and the through openings 202 are disposed in the grooves 221 respectively to enlarge air inlet of each vane 220 to balance pressure differences between two sides of the fan rotor.

According to another embodiment of this disclosure as shown in FIGS. 7 to 11, a fan rotor at least has a fan wheel **200*a*, the fan wheel 200*a* has an annular disk 210*a* and a plurality of vanes 220*a*. The vanes 220*a* and disposed in a radial arrangement on the annular disk 210*a* and formed as one piece. According to this embodiment, the vanes 220*a* are respectively disposed on two sides of the annular disk 210*a*** to allow the fan rotor to intake air through both sides.

Each of the vanes **220*a* is defined with a thickness Ta and a height Ha, the thickness Ta is parallel to the annular disk 210*a*, the height H is perpendicular to the annular disk 210*a*. According to this embodiment, in each of the vanes 220*a*, the thickness Ta is uniform along a longitudinal direction of the vane 220*a* and greater than or equal to 0.03 mm and less than or equal to 0.1 mm, but scopes of this disclosure should not be limited to this. For example, the thickness Ta of the vane 220***a* may be various along the longitudinal direction of the vane 220*a*. According to this embodiment, in each of the vanes 220*a*, the height H is uniformly defined with respect to the annular disk 210*a* and greater than or equal to 0.05 mm and less than or equal to 0.2 mm. According to this embodiment, the interval between each and another adjacent of the vanes 220*a* is equal to or larger than 0.2 mm. Specifically, a groove 221*a* is defined between each and another adjacent of the vanes 220*a*, the groove 221*a* is defined with a width Wa (namely the interval mentioned above), the width Wa is parallel to the annular disk 210*a* and the width Wa may be various at various portions of a longitudinal direction of the groove 221*a*, but the width Wa of the groove 221*a* is equal to or larger than 0.2 mm.

According to this embodiment, the fan rotor further has a hub 100, and the hub 100 is arranged at a center of the fan wheel 200. Specifically, a plurality of external lugs 111 are arranged on an outer edge of the hub 100*a*, a plurality of connecting holes 201*a* are arranged corresponding to the external lugs 111 on an inner edge of the annular disk 210*a*, the external lugs 111 are respectively connected to the connecting holes 201*a* to position the hub 100 at an center of the annular disk 210*a*.

Figure 12:
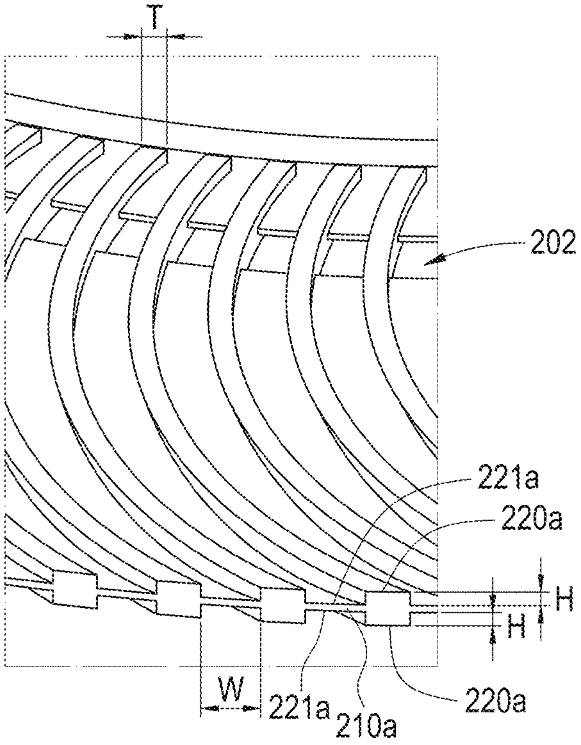
FIG. 12 is a perspective view showing a through opening according to the second embodiment of this disclosure.
Figure 13:
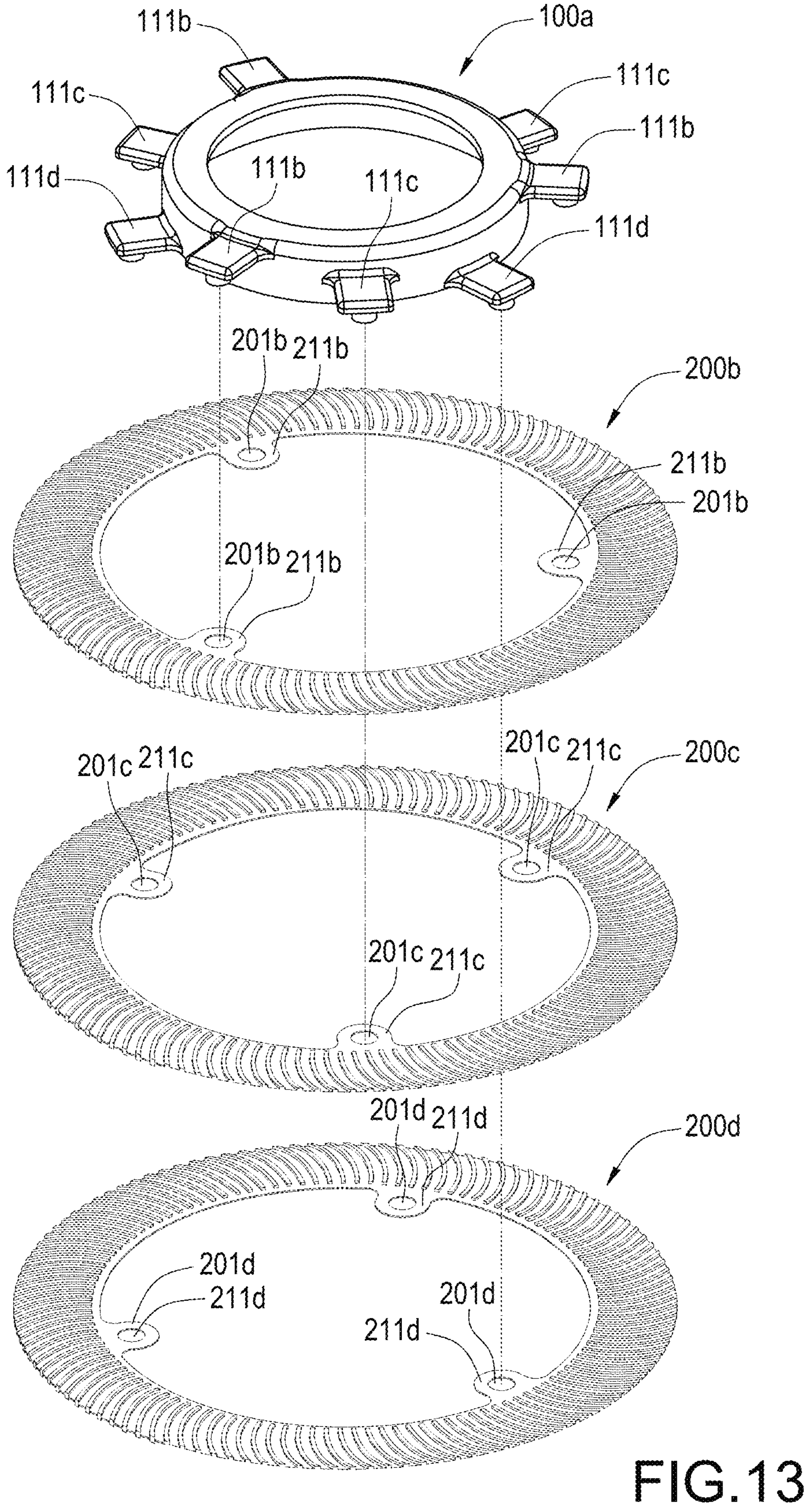
FIG. 13 is an exploded view showing a fan rotor according to the third embodiment of this disclosure.
Figure 14:
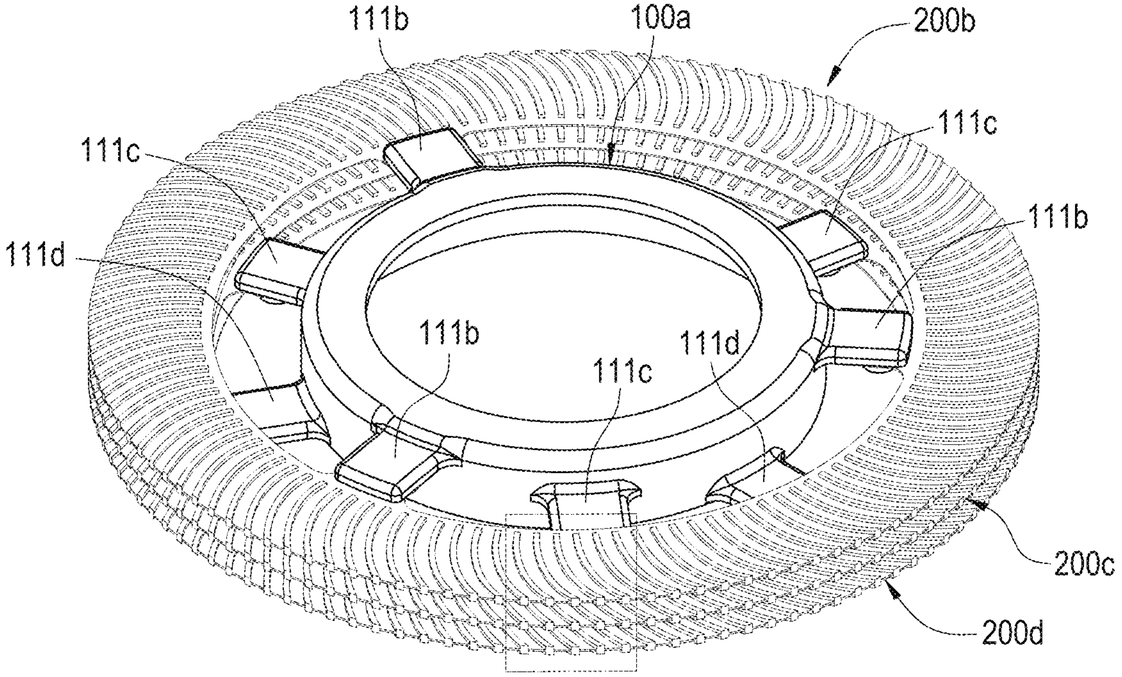
FIG. 14 is a perspective view showing the fan rotor according to the third embodiment of this disclosure.
Figure 15:
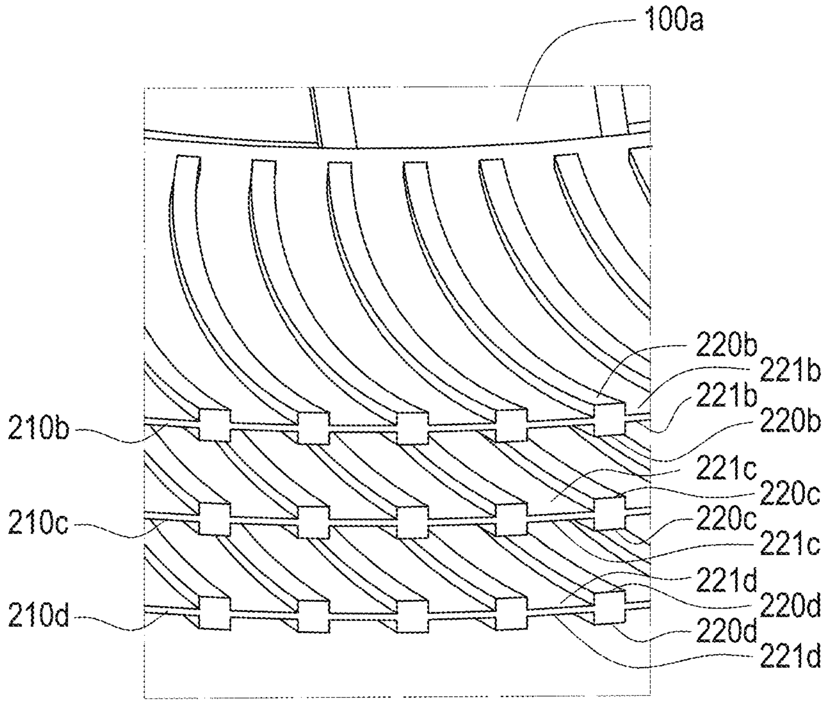
FIG. 15 is a partial enlarged view of FIG. 14.
Figure 16:
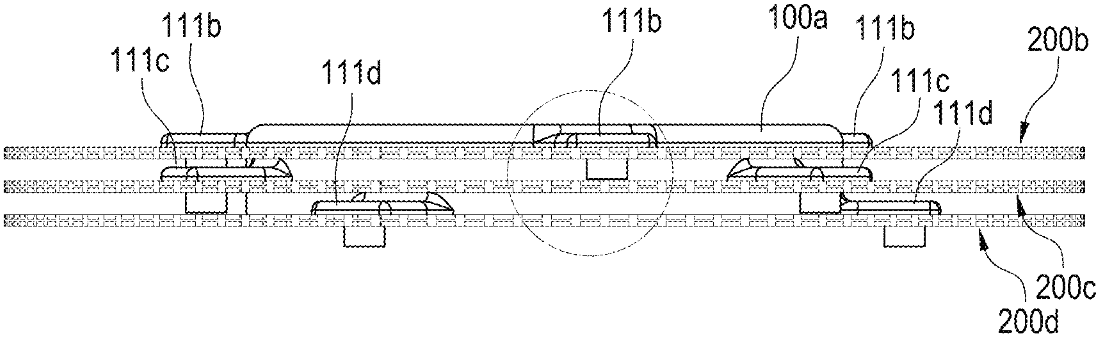
FIG. 16 is a side view of the fan rotor according to the third embodiment of this disclosure.
Figure 17:
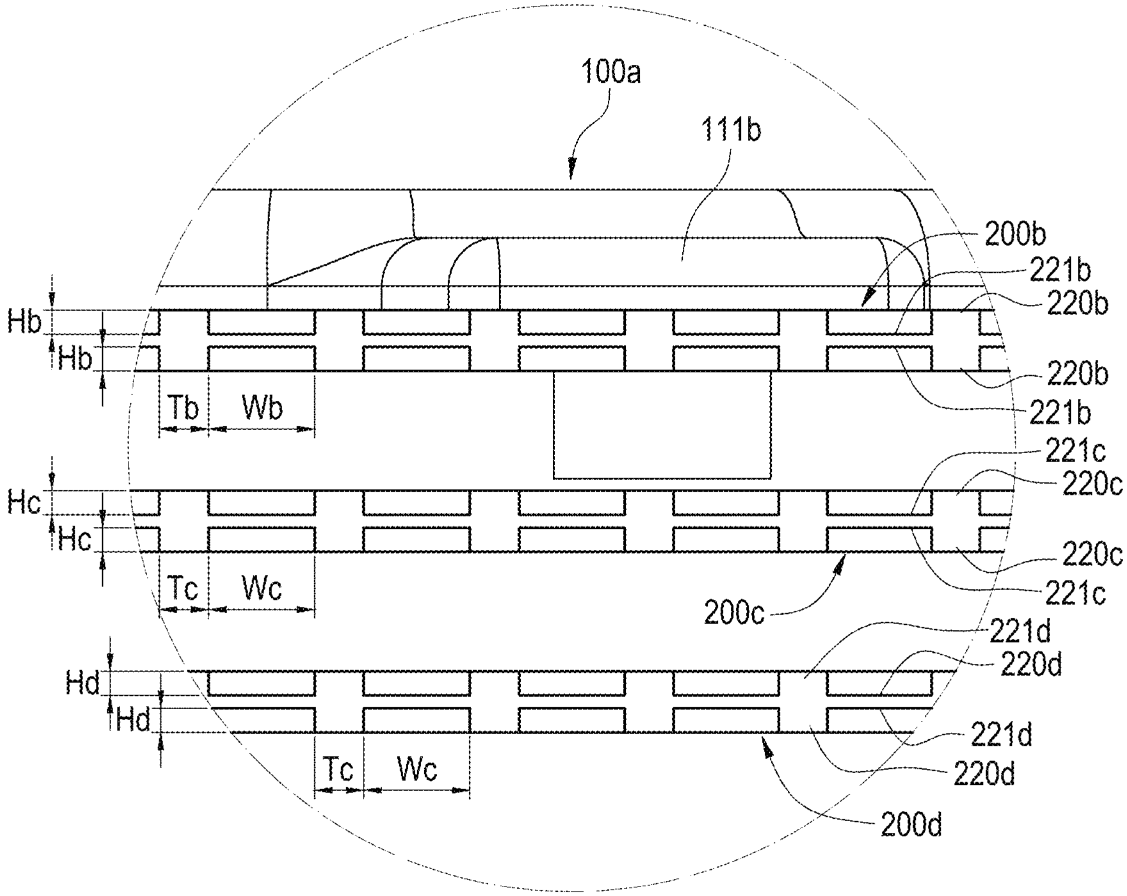
FIG. 17 is a partial enlarged view of FIG. 16.

According to this embodiment as shown in FIG. 12, a plurality of through openings 202 may be defined on the annular disk 210*a* to communicate two sides of the annular disk 210*a*, an the through openings 202 are respectively disposed in the grooves 221*a* to communicate the vanes 220 at the two sides of the annular disk 210*a* to enlarge air inlet of the vane 220*a* and balance pressure differences between two sides of the fan rotor.

According to another embodiment of this disclosure as shown in FIGS. 13 to 17, a fan rotor has a hub 100*a* and a plurality of fan wheels 200*b*, 200*c*, 200*d*. The fan wheels 200*b*, 200*c*, 200*d* are arranged on the hub 100*a* and the hub 100*a* is located at a center of the fan wheel 200*b*, 200*c*, 200*d*, and the fan wheel 200*b*, 200*c*, 200*d* are disposed in a stack at interval.

According to this disclosure, each of the fan wheel 200*b*, 200*c*, 200*d* has an annular disk 210*b*, 210*c*, 210*d* and a plurality of vanes 220*b*, 220*c*, 220*d*, in each fan wheel 200*b*, 200*c*, 200*d*, the vanes 220*b*, 220*c*, 220*d* are disposed in a radial arrangement on the annular disk 210*b*, 210*c*, 210*d* and formed as one piece. According to this embodiment, the vanes 220*b*, 220*c*, 220*d* are disposed at two sides of the annular disk 210*b*, 210*c*, 210*d* to allow the fan rotor to intake are from both sides.

Each of the vanes 220*b*, 220*c*, 220*d* is defined with a Tb, Tc, Td and a height Hb, Hc, Hd, the thickness Tb, Tc, Td is parallel to the annular disk 210*b*, 210*c*, 210*d*, and the height Hb, Hc, Hd is perpendicular to the annular disk 210*b*, 210*c*, 210*d*. According to this embodiment, in each of the vanes 220*b*, 220*c*, 220*d*, the thickness Tb, Tc, Td of the vane 220*b*, 220*c*, 220*d* is uniform along a longitudinal direction thereof and greater than or equal to 0.03 mm and less than or equal to 0.1 mm, but scopes of this disclosure should not be limited to this. For example, the thickness Tb, Tc, Td of the vane 220*b*, 220*c*, 220*d* may be various at various portions of the longitudinal direction of the vane 220*b*, 220*c*, 220*d*. According to this embodiment, in each of the vanes 220*b*, 220*c*, 220*d*, the height Hb, Hc, Hd is uniformly defined with respect to the annular disk 210*b*, 210*c*, 210*d* and greater than or equal to 0.05 mm and less than or equal to 0.2 mm. According to this embodiment, the interval between each and another adjacent of the vanes 220*b*, 220*c*, 220*d* is equal to or larger than 0.2 mm. Specifically, a groove 221*b*, 221*c*, 221*d* is defined between each and another adjacent of the vanes 220*b*, 220*c*, 220*d*, the groove 221*b*, 221*c*, 221*d* is defined with a width Wb, Wc, Wd (namely the interval mentioned above), the width Wb, Wc, Wd is parallel to the annular disk 210*a* and the width Wb, Wc, Wd may be various at various portions of a longitudinal direction of the groove 221*b*, 221*c*, 221*d*, but the width Wb, Wc, Wd of the groove 221*b*, 221*c*, 221*d* is equal to or larger than 0.2 mm.

According to this embodiment, the hub 100*a* has a plurality of external lugs 111*b*, 111*c*, 111*d* at an outer edge thereof, the external lugs 111*b*, 111*c*, 111*d* are stacked along an axial direction of the hub 100*a* separated from each other in a circumferential direction of the hub 100*a*. Each of the annular disks 210*b*, 210*c*, 210*d* has a plurality of internal lugs 211*b*, 211*c*, 211*d* disposed corresponding to the external lugs 111*b*, 111*c*, 111*d* on an inner edge thereof. The external lugs 111*b*, 111*c*, 111*d* are respectively connected to the internal lugs 211*b*, 211*c*, 211*d*. Specifically, each internal lug 211*b*, 211*c*, 211*d* is defined with a connecting hole 201*b*, 201*c*, 201*d* for connecting the external lug 111*b*, 111*c*, 111*d* correspondingly. Accordingly, when the fan wheels 200*b*, 200*c*, 200*d* are assembled in sequence, the inner lugs 211*b* of one fan wheel 200*b* can avoid the outer lugs 111*c*, 111*d* corresponding to other fan wheels 200*c*, 200*d* so as to be assembled to the external lug external lug 111*b* correspondingly, so that it is easy to assemble multiple fan wheels 200*b*, 200*c*, 200*d*.

According to this embodiment, the annular disk 210*b*, 210*c*, 210*d* may be provided with a plurality of through openings 202 communicating two sides of the annular disk 210*b*, 210*c*, 210*d*, and the through openings 202 are disposed in the grooves 221*b*, 221*c*, 221*d* respectively to enlarge air inlet of each vane 220*b*, 220*c*, 220*d* to balance pressure differences between two sides of the fan rotor.

Figure 18:
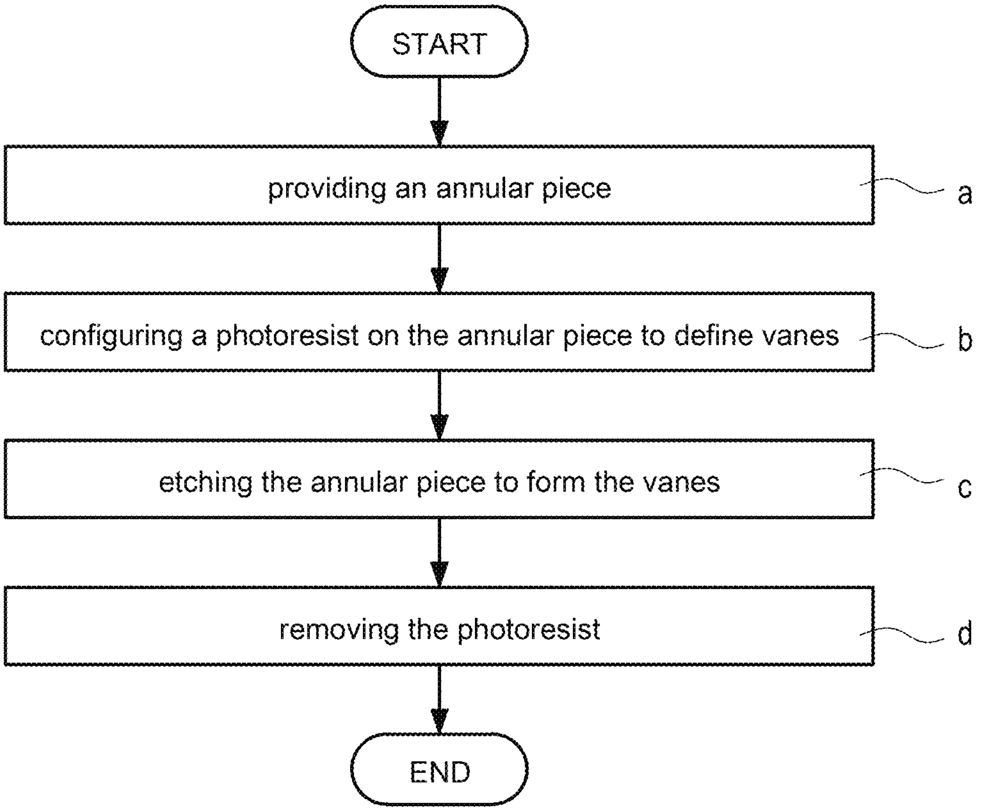
FIG. 18 is a flow chart of a manufacturing method of the fan rotor according to this disclosure.

According to FIG. 18, a manufacturing method of the fan rotor for manufacturing the fan rotor mentioned in above embodiments is provided in this disclosure. The manufacturing method of the fan rotor according to this disclosure has steps described in following paragraph.

Figure 19:
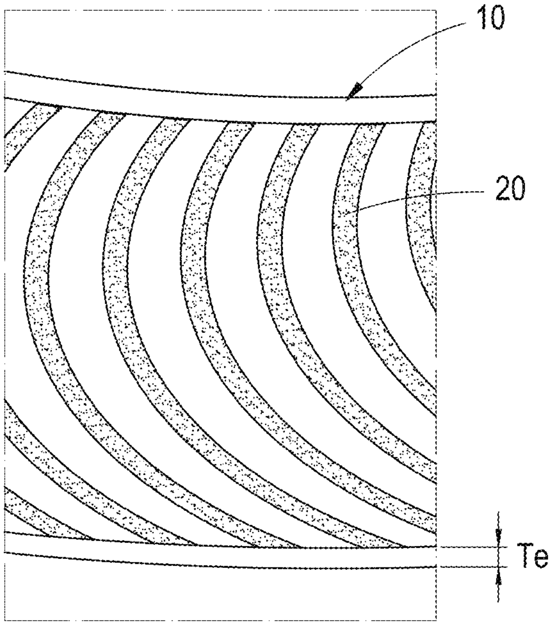
FIGS. 19 to 20 are schematic views showing steps of the manufacturing method of the fan rotor according to this disclosure.

According to an example of manufacturing the fan rotor of the aforementioned embodiment as shown in FIGS. 1 to 6, firstly providing an annular piece 10 in a step a as shown in FIGS. 18 and 19. The annular piece 10 may be made of plastic or metal, and a thickness Te of the annular piece 10 is equal to or greater than 0.1 mm. The annular piece 10 is not the annular disk 210 mentioned above.

In a step b following step a as shown in FIGS. 18 and 19, arranging a photoresist 20 on the annular piece 10 and defining a predetermined appearance of a plurality of vanes by the photoresist 20.

In a step c following step b as shown in FIGS. 18 and 19, etching the annular piece 10 to remove a part of the annular piece 10 without the photoresist 20. Specifically, the annular piece 10 is etched to form the annular disk 210 mentioned above, a part of the annular piece without the photoresist 20 is not etched so as to form the. The vanes 220 are disposed in a radial arrangement.

All of the vanes 220 may be disposed together on one side of the annular disk 210, namely that another side of the annular disk 210 is flat. Alternatively, the vane 220*a* may be respectively disposed on two sides of the annular disk 210*a* according to the second embodiment as shown in FIGS. 7 to 12.

According to an example of manufacturing the fan rotor of the aforementioned embodiment as shown in FIGS. 1 to 6, specifically, one side of the annular piece 10 may be etched to dispose all of the vanes 220 together on one side of the annular disk 210. According to an example of manufacturing the fan rotor of the aforementioned embodiment as shown in FIGS. 7 to 12, two sides of the annular piece 10 may be etched to form the vanes 220*a* on two sides of the annular disk 210 respectively.

Figure 20:
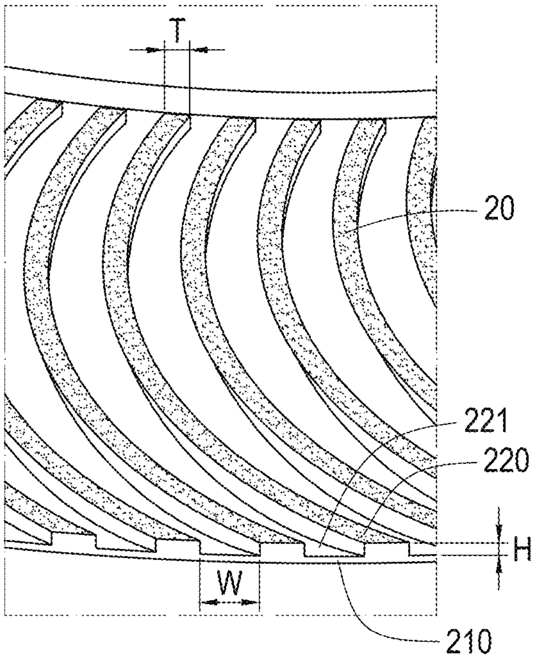

According to FIG. 20, each of the vanes 220 made by the steps mentioned above is defined with a thickness T and a height H, the thickness is parallel to the annular disk 210, and the height H is perpendicular to the annular disk 210. According to this embodiment, in each of the vane 220, the thickness T may be uniform along the longitudinal direction of the vane 220 and greater than or equal to 0.03 mm and less than or equal to 0.1 mm, but scopes of this disclosure should not be limited to this. For example, the thickness T of the vane 220 may be various at various portions of the longitudinal direction of the vane 220. According to this embodiment, in each of the vanes 220, the height H is uniformly defined with respect to the annular disk 210 and greater than or equal to 0.05 mm and less than or equal to 0.2 mm. According to this embodiment, each and another adjacent of the vanes 220 are defined with an interval which is equal to or larger than 0.2 mm.

Specifically, a groove 221 is defined between each and another adjacent of the vanes 220, the groove 221 is defined with a width W (namely the interval mentioned above), the width W is parallel to the annular disk 210 and the width W may be various at various portions of a longitudinal direction of the groove 221, but the width W of the groove 221 is equal to or larger than 0.2 mm.

In a step c following step b as shown in FIGS. 18 and 6, removing the photoresist 20 to accomplish the fan rotor.

According to this embodiment, the annular piece 10 is etched to penetrate at a portion thereof to form a plurality of through openings 202 on the annular disk 210 in an etching process. Each of the through openings 202 is disposed between two of the vanes 220 adjacent to each other, namely that the groove 221 is formed by etching and then secondary etched through. Alternatively, the annular piece 10 may be etched through in an etching process of the groove 221.

The vanes are formed by etching in the manufacturing method of the fan rotor according to this disclosure forms so as to be manufacture a centrifugal fan rotor having micro vanes densely configured.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of this disclosure as defined in the appended claims.

What is claimed is:

1. A fan rotor, comprising:

a hub comprising a plurality of external lugs disposed at an outer edge thereof; and a plurality of fan wheels, arranged on the hub, the fan wheels arranged in a stack and at intervals, each of the fan wheels comprising an annular disk and a plurality of vanes, the vanes and the annular disk in each of the fan wheels formed as one piece by etching, the vanes disposed in a radial arrangement on the annular disk, each of the vanes defined with a thickness greater than or equal to 0.03 mm and less than or equal to 0.1 mm, a groove defined between each vane and another vane adjacent thereto, and each groove defined with a width equal to or larger than 0.2 mm, wherein the annular disk comprises a plurality of internal lugs with respect to corresponding external lugs disposed on an inner edge thereof;

wherein when the fan wheels are assembled in sequence, the internal lugs of one of the fan wheels avoid other external lugs corresponding to others of the fan wheels so as to be assembled to the corresponding external lugs, respectively.

2. The fan rotor according to claim 1, wherein the annular disk comprises a plurality of through openings, and the through openings are defined at the grooves respectively.

3. The fan rotor according to claim 1, wherein each vane comprises a height greater than or equal to 0.05 mm and less than or equal to 0.2 mm.

4. The fan rotor according to claim 1, wherein a height of the vane is uniformly defined with respect to the annular disk.

5. The fan rotor according to claim 1, wherein the vanes are respectively disposed at two sides of the annular disk.

6. The fan rotor according to claim 1, wherein the vanes are respectively disposed at one sides of the annular disk.

7. The fan rotor according to claim 1, wherein the external lugs are stacked along an axial direction of the hub and separated from each other in a circumferential direction of the hub.

8. A manufacturing method of a fan rotor, the manufacturing method comprising:

a) providing an annular piece;

b) disposing a photoresist on a surface of the annular piece, and defining a predetermined appearance of a plurality of vanes;

c) firstly etching the annular piece to remove a part of the annular piece, which is free from the photoresist, to form an annular disk and the vanes, wherein the vanes are disposed on the annular disk, the vanes are disposed in a radial arrangement, an interval between any two of the vanes adjacent to each other is equal to or larger than 0.2 mm, each vane comprises a thickness greater than or equal to 0.03 mm and less than or equal to 0.1 mm;

d) removing the photoresist; and secondary etching the annular piece to penetrate the annular disk to form a plurality of through openings, wherein each through opening is disposed between two of the vanes adjacent to each other.

9. The manufacturing method according to claim 8, further comprising etching two sides of the annular piece to form the vanes at two sides of the annular disk.

10. The manufacturing method according to claim 8, further comprising etching one side of the annular piece to form the vanes.

11. The manufacturing method according to claim 8, wherein each vane comprises a height greater than or equal to 0.05 mm and less than or equal to 0.2 mm.

* * * * *